United States Patent
Kitajima (12)

(10) Patent No.: US 9,813,634 B2
(45) Date of Patent: Nov. 7, 2017

(54) IMAGE PROCESSING APPARATUS AND METHOD

(71) Applicant: CANON KABUSHIKI KAISHA, Tokyo (JP)

(72) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/609,126

(22) Filed: May 31, 2017

(65) Prior Publication Data
US 2017/0264808 A1 Sep. 14, 2017

Related U.S. Application Data

(63) Continuation of application No. 14/887,884, filed on Oct. 20, 2015, now Pat. No. 9,699,386.

(30) Foreign Application Priority Data

Oct. 23, 2014 (JP) .................. 2014-216631

(51) Int. Cl.
| | |
|---|---|
| *H04N 5/235* | (2006.01) |
| *H04N 5/225* | (2006.01) |
| *H04N 5/232* | (2006.01) |
| *H04N 9/04* | (2006.01) |
| *G06K 9/00* | (2006.01) |
| *G06K 9/20* | (2006.01) |
| *G06T 5/00* | (2006.01) |

(52) U.S. Cl.
CPC ....... *H04N 5/2354* (2013.01); *G06K 9/00221* (2013.01); *G06K 9/2027* (2013.01); *G06T 5/008* (2013.01); *H04N 5/2256* (2013.01); *H04N 5/23219* (2013.01); *H04N 9/045* (2013.01); *G06T 2200/04* (2013.01); *G06T 2207/10028* (2013.01); *G06T 2207/20012* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 8,698,804 | B2 * | 4/2014 | Tomite | G06T 15/06 345/426 |
| 2001/0045955 | A1 * | 11/2001 | Oka | G06T 15/80 345/582 |
| 2009/0210203 | A1 * | 8/2009 | Won | G06F 17/509 703/2 |

* cited by examiner

*Primary Examiner* — Mark T Monk
(74) *Attorney, Agent, or Firm* — Cowan, Liebowitz & Latman, P.C.

(57) ABSTRACT

An image processing apparatus comprising: an obtaining unit configured to obtain a first image of an object shot with flashing of an illumination device and distance information of distances to a plurality of positions of the object; a determination unit configured to determine a position of a virtual light source that emits virtual light; and a processing unit configured to obtain shape information of the object based on the distance information, and generate an image in which the object is illuminated by the virtual light source by processing the first image based on the obtained shape information of the object, the distance information, and the position of the virtual light source with respect to the object.

8 Claims, 10 Drawing Sheets

IMAGE PROCESSING APPARATUS AND METHOD

CROSS-REFERENCE TO RELATED APPLICATION

This application is a continuation of application Ser. No. 14/887,884, filed Oct. 20, 2015, the entire disclosure of which is hereby incorporated by reference.

BACKGROUND OF THE INVENTION

Field of the Invention

The present invention relates to an image processing apparatus and method, and, more specifically, to a technique for correcting brightness of an input image.

Description of the Related Art

Upon shooting an image of an object, if the brightness of the object is insufficient, a captured image may be dark. If a gain is applied to the captured image in order to compensate for the brightness of a dark portion of the image, noise is also amplified, and it is difficult to obtain a high quality image. Conventionally, in order to obtain an image with low noise while compensating for the brightness of an object, there is a method of using an illumination device, such as an electronic flash unit, to secure sufficient brightness and shooting the illuminated object. However, the shade of the object will be lost by flashing the illumination device, such as an electronic flash unit, when shooting the image, and the obtained image may look flat with the plasticity of the object being lost.

As a method for shooting an image without losing the plasticity of an object, Japanese Patent Laid-Open No. 2005-167376 suggests a method of shooting a plurality of images under a plurality of illumination conditions, such as illumination positions, using a plurality of illumination devices, such as electronic flash units, and from among the plurality of images, selecting an image with shade.

However, in the method suggested by Japanese Patent Laid-Open No. 2005-167376, it is necessary to shoot an object many times by changing illumination conditions of the plurality of illumination devices. Furthermore, as for images whose shade is lost by using illumination devices when shooting the images, the lost shade cannot be recovered.

SUMMARY OF THE INVENTION

The present invention has been made in consideration of the above situation, and obtains an image with sufficient shade based on an image from which shade of an object is lost due to illumination by an illumination device, such as an electronic flash unit.

According to the present invention, provided is an image processing apparatus comprising: an obtaining unit configured to obtain a first image of an object shot with flashing of an illumination device and distance information of distances to a plurality of positions of the object; a determination unit configured to determine a position of a virtual light source that emits virtual light; and a processing unit configured to obtain shape information of the object based on the distance information, and generate an image in which the object is illuminated by the virtual light source by processing the first image based on the obtained shape information of the object, the distance information, and the position of the virtual light source with respect to the object.

According to the present invention, provided is an image processing method comprising: obtaining a first image of an object shot with flashing of an illumination device and distance information of distances to a plurality of positions of the object; determining a position of a virtual light source that emits virtual light; obtaining shape information of the object based on the distance information; and generating an image in which the object is illuminated by the virtual light source by processing the first image based on the obtained shape information of the object, the distance information, and the position of the virtual light source with respect to the object.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. In the following embodiments, it is assumed that the present invention is applied to a digital camera, as an image processing apparatus.

First Embodiment

Figure 1:
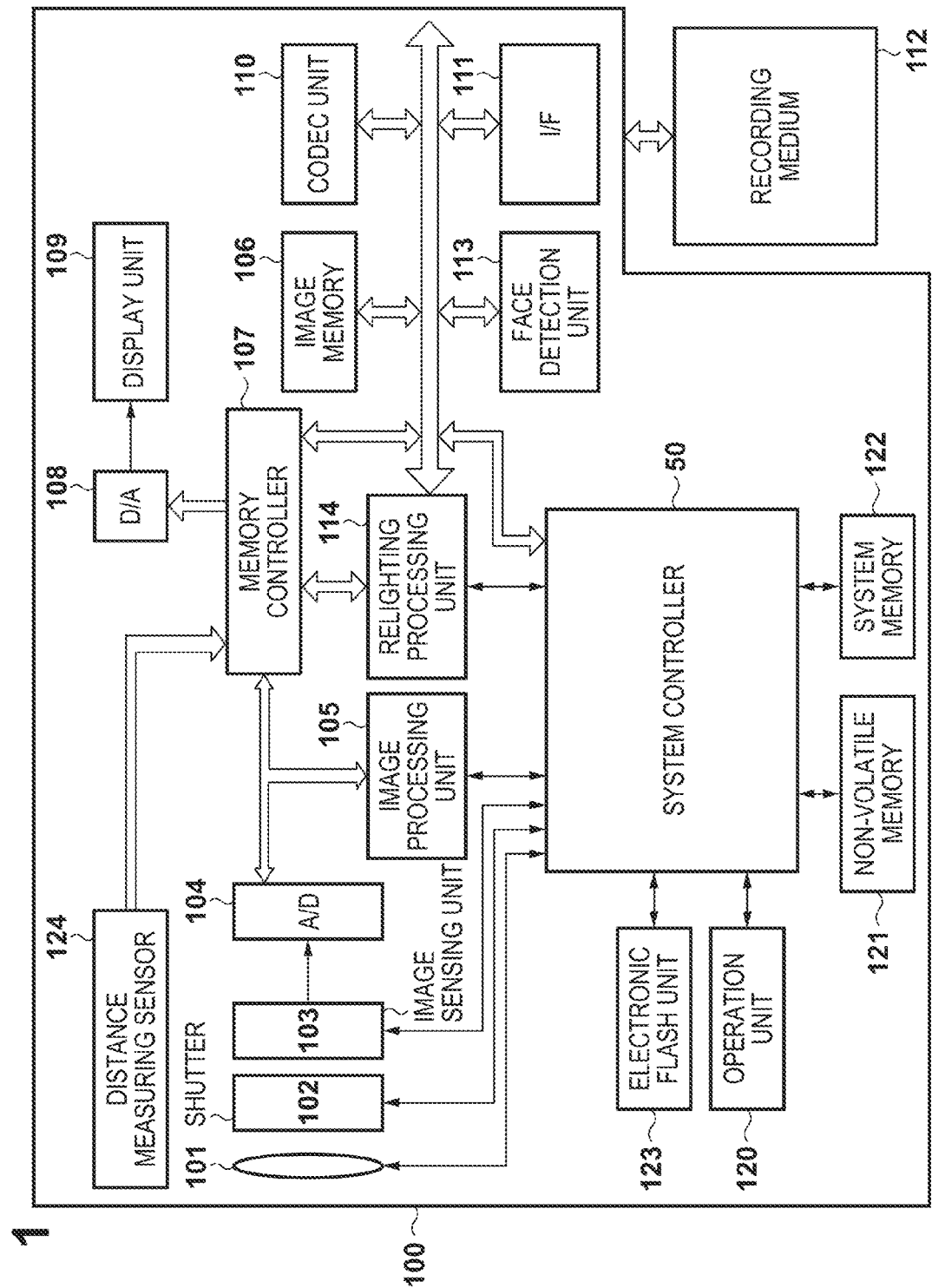
FIG. 1 is a block diagram illustrating a configuration of a digital camera according to an embodiment of the present invention.

A first embodiment of the present invention will be explained with reference to FIGS. 1 to 7. FIG. 1 is a block diagram illustrating an example of a configuration of a digital camera 100 according to a first embodiment.

In the digital camera 100 as shown in FIG. 1, light that has entered through a lens group 101 (an imaging optical system) that includes a zoom lens and a focus lens, and a shutter 102 having an aperture stop function, undergoes photoelectric conversion in an image sensing unit 103. The image sensing unit 103 is comprised of CCD, CMOS sensor, or the like, and an electric signal obtained by the photoelectric conversion is output to an A/D converter 104 as an image signal. The A/D converter 104 converts an analog image signal output from the image sensing unit 103 to a digital image signal (image data), and outputs the digital image signal to an image processing unit 105.

The image processing unit 105 applies to the image data from the A/D converter 104, or image data read out from an image memory 106 via a memory controller 107 a variety of image processes, such as color conversion process including white balance correction, γ correction, edge enhancing process, color correction, and so on. The image data output from the image processing unit 105 is written to the image memory 106 via the memory controller 107. The image memory 106 stores image data output from the image processing unit 105 and image data to be displayed on a display unit 109.

A face detection unit 113 detects a face region where a human face exists in a captured image. The image processing unit 105 performs a predetermined evaluation value calculation process using the result of the face detection by the face detection unit 113 and the captured image data, and a system controller 50 performs exposure control and focus control using obtained evaluation values. In this manner, through-the-lens auto focus (AF) processing, auto exposure (AE) processing, and auto white balance (AWB) processing, and so forth, are performed.

A D/A converter 108 converts the digital image data for display stored in the image memory 106 into an analog signal, and provides the analog signal to the display unit 109. The display unit 109 displays an image on a display screen, such as LCD, in accordance with the analog signal from the D/A converter 108.

A codec unit 110 compresses and encodes the image data stored in the image memory 106 based on standards, such as JPEB and MPEG. The system controller 50 stores the encoded image data to a recording medium 112, such as a memory card, hard disk, and so on, via an interface (I/F) 111.

Further, image data read out from the recording medium 112 via the I/F 111 is decoded and expanded by the codec unit 110, and stored in the image memory 106. By displaying the image data stored in the image memory 106 on the display unit 109 via the memory controller 107 and the D/A converter 108, an image can be reproduced and displayed.

A relighting processing unit 114 performs relighting processing on a captured image. The relighting processing performed by the relighting processing unit 114 will be explained later in detail.

The system controller 50 performs overall control of the digital camera 100. A non-volatile memory 121 is configured with memory, such as EEPROM, and stores programs and parameters that are necessary for processing by the system controller 50. A system memory 122 is used for developing constants, variables, programs read out from the non-volatile memory 121, and so on, for operation of the system controller 50.

An operation unit 120 receives operation by a user. An electronic flash unit 123 is an illumination device, and a distance measuring sensor 124 measures the distance to an object.

Figure 2:
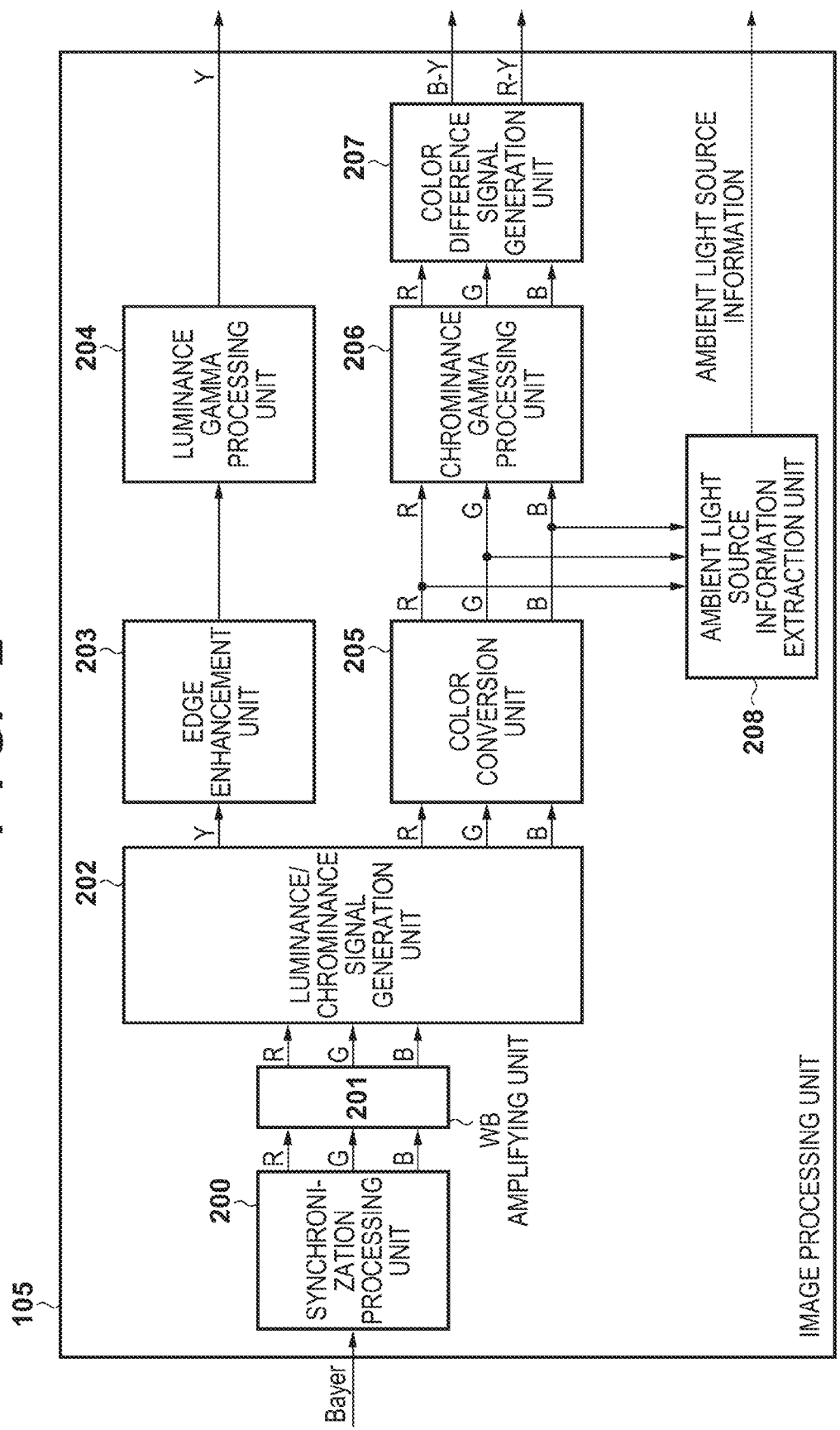
FIG. 2 is a block diagram illustrating a configuration of an image processing unit according to the embodiment.

FIG. 2 is a block diagram illustrating a configuration of the image processing unit 105. The processing performed by the image processing unit 105 will be explained below with reference to FIG. 2. In this embodiment, it is assumed that the image sensing unit 103 is covered with a color filter of Bayer arrangement. Accordingly, each pixel of the image sensing unit 103 outputs one of R, G and B image signals.

Image signals inputted to the image processing unit 105 from the A/D converter 104 is first inputted to a synchronization processing unit 200 in FIG. 2. The synchronization processing unit 200 performs synchronization processing on inputted R, G and B signals to generate R, G and B signals for each pixel. A WB amplifying unit 201 applies gains to the generated R, G and B signals based on white balance gains calculated by the system controller 50 in a known process, thereby correcting white balance. The R, G and B signals whose white balance is corrected by the WB amplifying unit 201 are inputted to a luminance/chrominance signal generation unit 202. The luminance/chrominance signal generation unit 202 generates a luminance signal Y from the R, G and B signals, and outputs the generated luminance signal Y to an edge enhancement unit 203, and outputs the R, G and B signals to a color conversion unit 205.

The edge enhancement unit 203 performs an edge enhancement process on the luminance signal Y, and outputs the result to a luminance gamma processing unit 204. The luminance gamma processing unit 204 performs a gamma process on the luminance signal Y, and outputs the result to the image memory 106 via the memory controller 107.

Meanwhile, the color conversion unit 205 applies a matrix operation to the R, G and B signals, and converts them to have a desired color balance. A chrominance gamma processing unit 206 performs gamma correction on the R, G and B signals, and a color difference signal generation unit 207 generates color difference signals R-Y and B-Y from the R, G and B signals.

The luminance signal Y and color difference signals R-Y and B-Y (image data) thus generated are temporarily stored in the image memory 106, then compressed and encoded by the coded unit 110, and recorded on the recording medium 112.

Further, the R, G and B signals processed by the color conversion unit 205 are also inputted to an ambient light source information extraction unit 208. The ambient light source information extraction unit 208 obtains information for estimating the state of actual ambient light. The state of the ambient light is the direction of light source with respect to the camera 100 in this embodiment, and the ambient light source information extraction unit 208 outputs luminance distribution information for estimating the direction of light source as ambient light source information. Then, the outputted ambient light source information is stored in the system memory 122. Note that in a case where an image shooting is performed with flashing of the electronic flash unit 123, an image is shot before flashing the electronic flash unit 123, and the luminance distribution information of the shot image is outputted as the ambient light source information. The method for estimating the ambient light source information will be explained later.

Next, the relighting processing performed by the relighting processing unit 114 on the image data (luminance signal Y and color difference signals R-Y and B-Y) output from the image processing unit 105 will be explained. Note that, prior to the processing performed by the relighting processing unit 114, the system controller 50 calculates control parameters to be set in the relighting processing unit 114, and sets them in the relighting processing unit 114.

Figure 3:
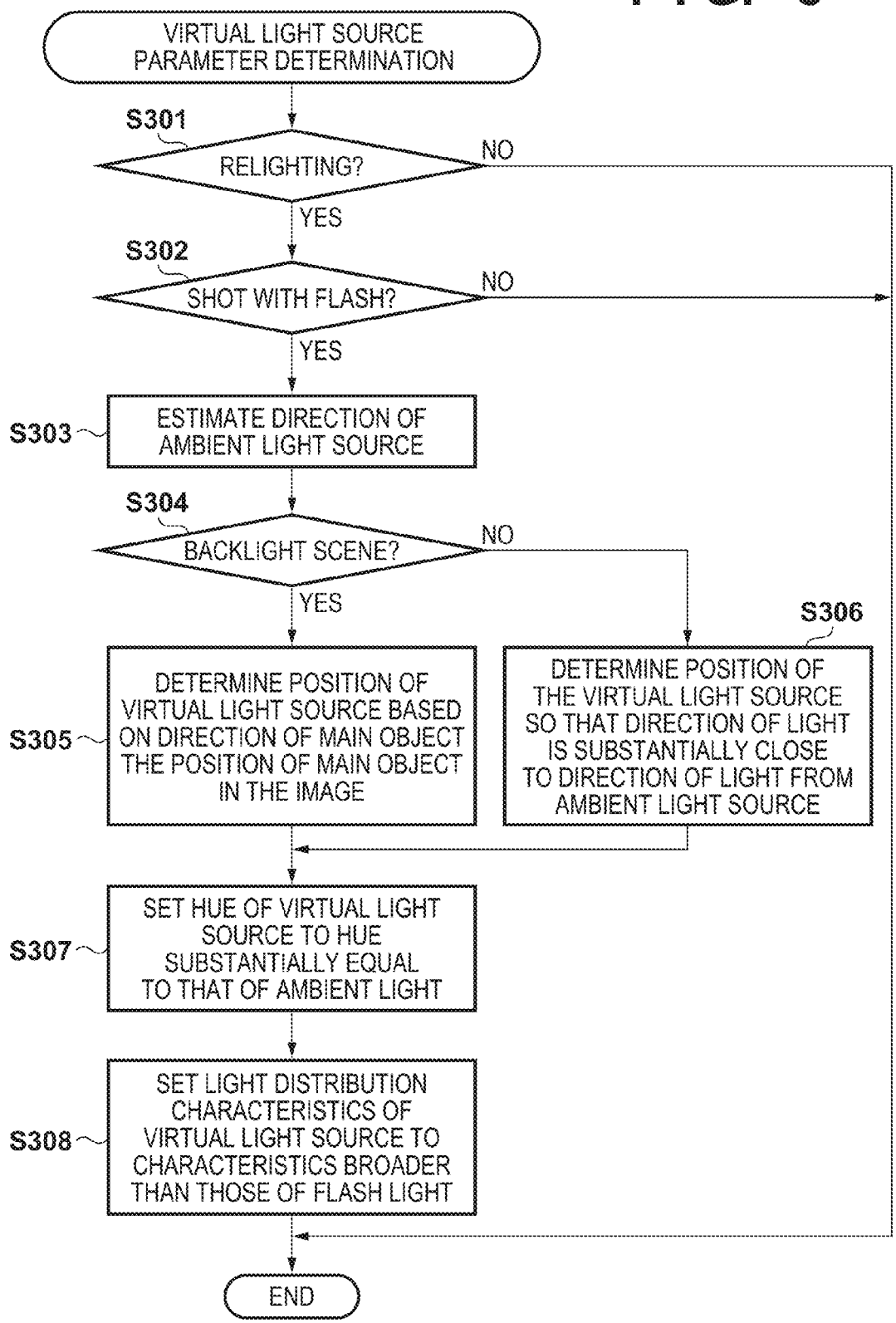
FIG. 3 is a flowchart of a process for determining parameters of a virtual light source according to the embodiment.

FIG. 3 is a flowchart showing processes performed by the system controller 50 when the relighting processing is performed. A virtual light source parameter determination processing performed by the system controller 50 when the relighting processing is performed will be explained with reference to FIG. 3.

In step S301, whether or not the relighting processing is selected by an operation on the operation unit 120 by a user is determined. If the relighting processing is selected, the process proceeds to step S302, whereas if the relighting processing is not selected, the process ends.

In step S302, whether or not an image subjected to the processing is shot with flashing of the electronic flash unit 123 is determined. If yes, the process proceeds to step S303, whereas if not, the process ends. In step S303, the direction of an ambient light source is estimated from the ambient light source information obtained by the ambient light source information extraction unit 208 based on an image shot prior to flashing the electronic flash unit 123. Examples of the process performed in step S303 will be explained with reference to FIGS. 4A and 4B below.

Figure 4A:
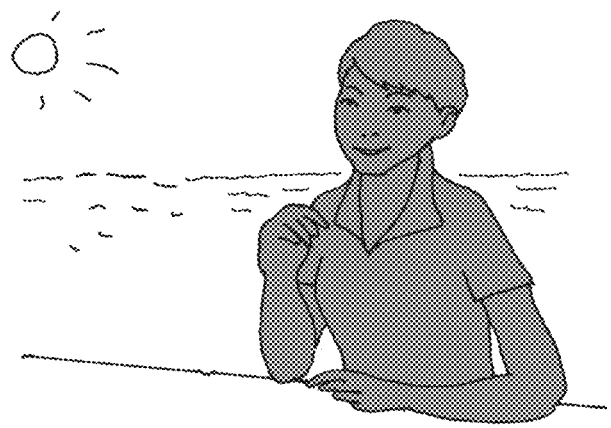
FIGS. 4A and 4B are conceptual views showing examples of states of ambient light according to the embodiment.
Figure 4B:
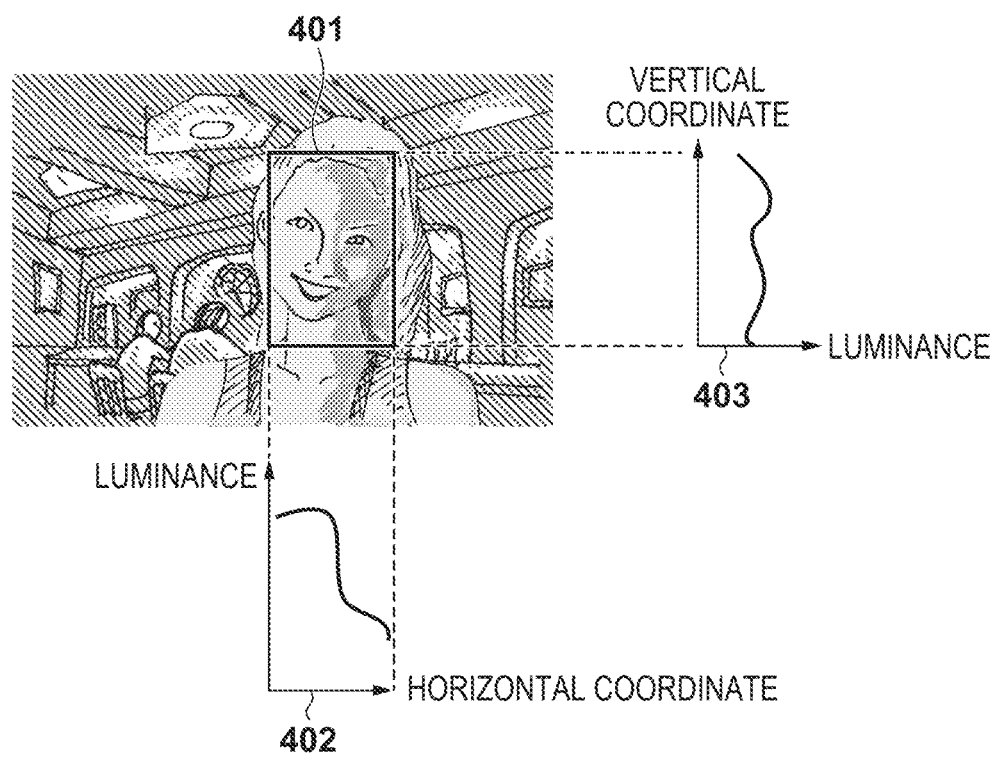

First, it is determined whether or not the image is a backlight scene. This determination can be performed using a known technique. For example, using exposure information at the time of shooting an image and luminance information of the shot image, if the illuminance of the image calculated form the exposure information is higher than a predetermined threshold, and if the luminance of an upper portion of the image is high and the luminance of a central portion of the image is low, the image is determined as a backlight scene. An example of an image determined as a backlight scene is shown in FIG. 4A, and an example of an image determined as not a backlight scene is shown in FIG. 4B.

Further, in a case where the image is not a backlight scene, the direction of the ambient light source is estimated in more detail. In the embodiment, the direction of the ambient light source is determined from how a main object is shaded in the image shot prior to flashing the electronic flash unit 123. An example will be described with reference to FIG. 4B below. In a case where the main object is a human, an average luminance of a skin portion of a face region 401 is calculated. A graph 402 shows a luminance distribution of the skin portion of the face region 401 in the horizontal direction. Based on the luminance distribution in the horizontal direction, it is determined which of the luminance on the right side of the face and the luminance on the left side of the face is higher, in other words, which of the right side of the face and the left side of the face is brighter. FIG. 4B shows an example in which the left side of the face is brighter than the right side of the face. Accordingly, it is estimated that the ambient light source is located on the left side with respect to the human. Similarly, the graph 403 shows a luminance distribution of the skin portion of the face region 401 in the vertical direction. Based on the luminance distribution in the vertical direction, it is determined which of the luminance on the upper side of the face and the luminance on the lower side of the face is higher, in other words, which of the upper side of the face and the lower side of the face is brighter. FIG. 4B shows an example in which there is no large difference in the brightness between the upper and lower sides of the face, and it is assumed that the ambient light source is located at the height nearly equivalent to the center of the face.

Returning to FIG. 3, it is determined in step S304 whether or not the image is a backlight scene is determined based on the direction of the ambient light source estimated in step S303. If it is determined that the image is a backlight scene, then the process proceeds to step S305, whereas if it is determined that the image is not a backlight scene, the process proceeds to step S306.

Figure 5A:
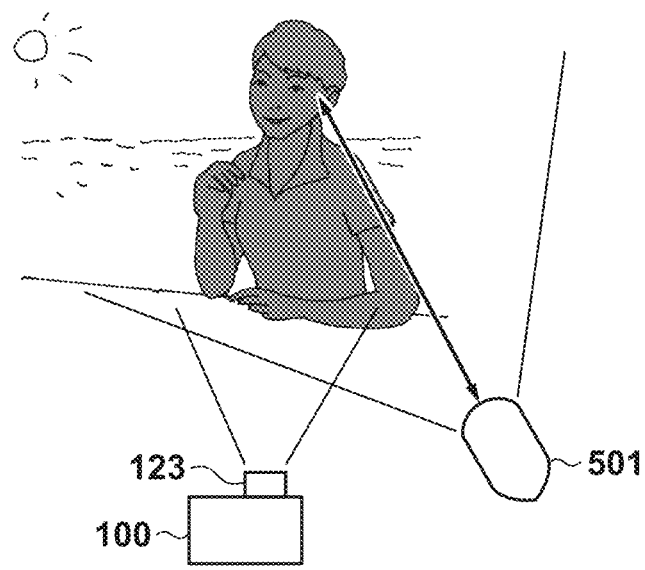
FIGS. 5A to 5C are conceptual views showing examples of positions at which a virtual light source is placed according to the embodiment.

In step S305, the position of a virtual light source is determined based on the direction of the main object (a person in the embodiment) and the position of main object in the image. Here, the method of the process in S305 will be explained with reference to FIGS. 5A to 5C. FIG. 5A shows positional relationship between an object, the camera 100, and the electronic flash unit 123 when no flash light is illuminated. Since the positional relationship between the camera 100 and the electronic flash unit 123 are fixed, the direction of flash light with respect to the object can be specified. In step S305, a virtual light source is set at a position different from the position of the electronic flash unit 123. More specifically, the position of the virtual light source may be set in accordance with the face direction of the main object. In a case where the main object faces the right as in FIG. 5A, the left side of the face is dominant in the image. Accordingly, the virtual light source is arranged on the position 501 on the right side with respect to the main object.

Figure 5B:
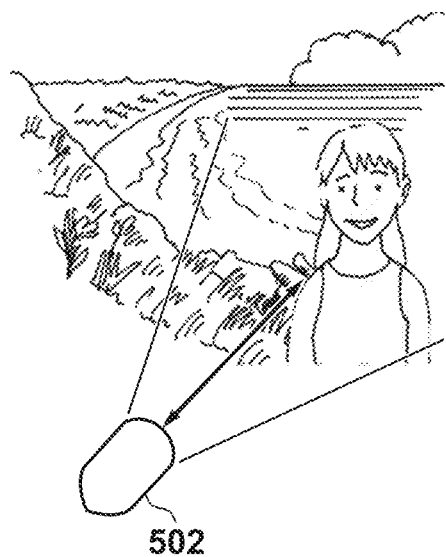
Figure 5C:
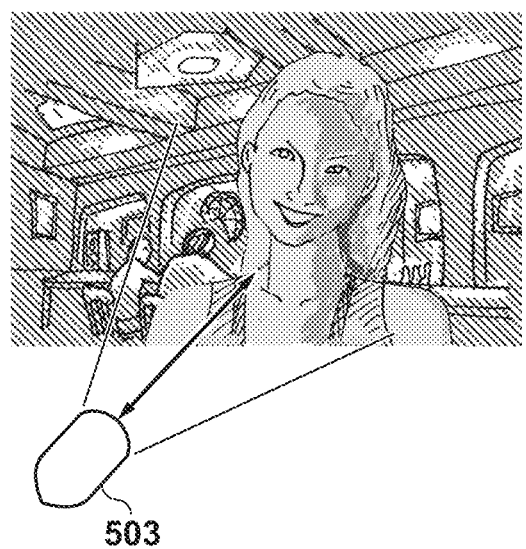

When the main object faces the front, the position of the virtual light source is determined depending upon the position of the main object in the image. For example, if the main object is located on the right side of an image as shown in FIG. 5B, then the virtual light source is placed at the position 502 that illuminates the main object from the left with respect to the main object.

Returning to FIG. 3, in a case where the image is not a backlight scene, then at step S306, the position of the virtual light source is determined so that the direction of the light from the ambient light source and the direction of light from the virtual light source are substantially close to each other. For example, in the example shown in FIG. 5C, it is determined that the main object is illuminated by the ambient light source from the right as determined in step S303, therefore, the position of the virtual light source is determined at the position 503 that illuminates the main object from the right.

In step S307, the hue of the virtual light source is set so as to be substantially equal to that of the ambient light. This control will be described later. In step S308, the light distribution characteristics of the virtual light source are set to the characteristics that are broader than those of flash light. By setting the light distribution characteristics of the virtual light source to those of diffused light which is closer to the ambient light, it is possible to obtain a more natural image. With the above processing, the parameters of the virtual light source used in the relighting processing are determined.

Figure 6:
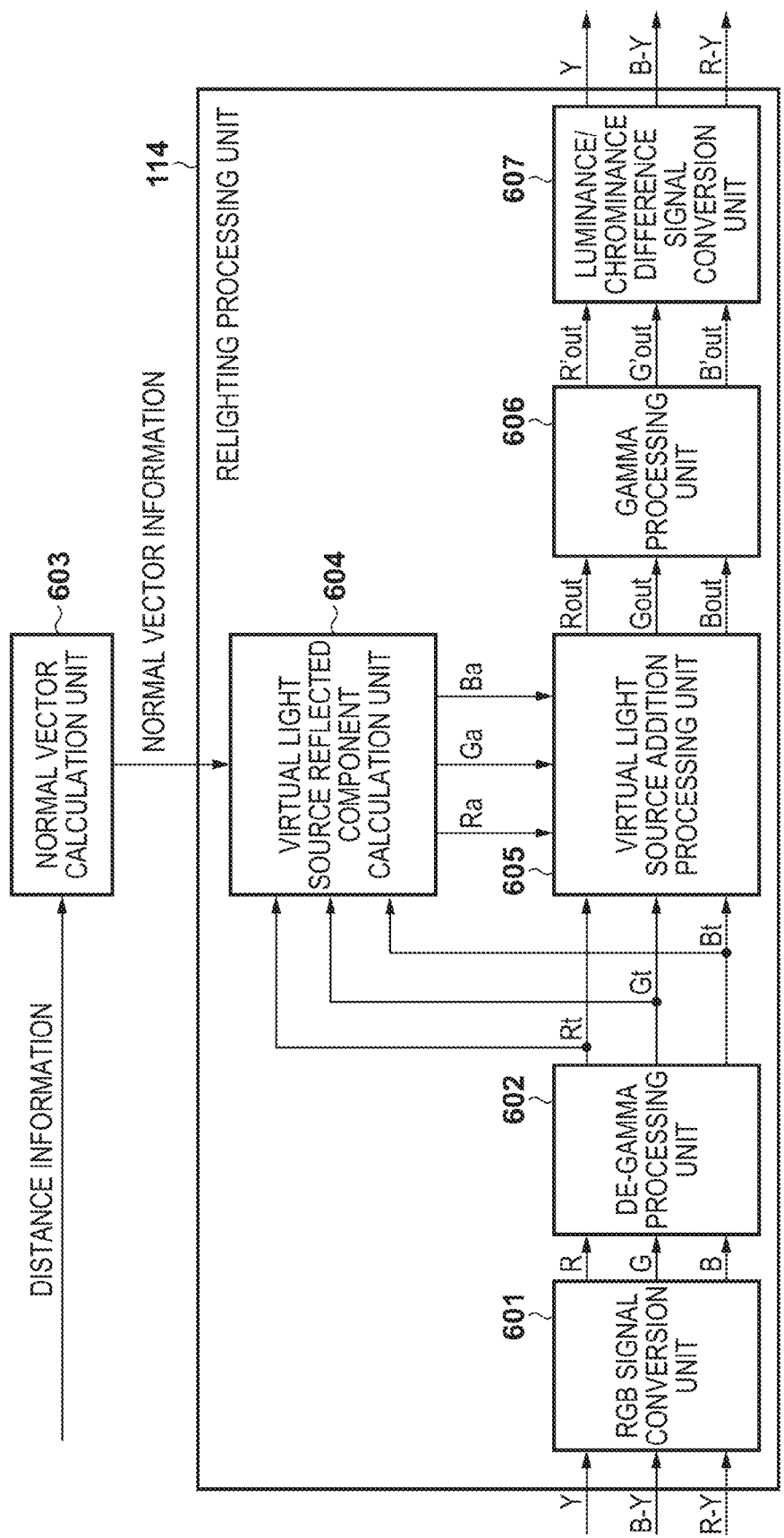
FIG. 6 is a block diagram illustrating a configuration of a relighting processing unit according to a first embodiment of the present invention.

Next, the configuration and operation of the relighting processing unit 114 will be explained. FIG. 6 is a block diagram illustrating the configuration of the relighting processing unit 114. The operation of the relighting processing unit 114 will be explained below with reference to FIG. 6.

The relighting processing unit 114 reads out and inputs the luminance signal Y and the color difference signals R-Y and B-Y that are processed by the image processing unit 105 and stored in the image memory 106. An RGB signal conversion unit 601 converts the input luminance signal Y and the color difference signals R-Y and B-Y into R, G and B signals, and outputs the result to a de-gamma processing unit 602.

The de-gamma processing unit 602 performs an operation (de-gamma processing) whose characteristics are opposite to those of the gamma correction performed by the luminance gamma processing unit 204 and the chrominance gamma processing unit 206 of the image processing unit 105, and converts the R, G and B signals to linear data. The de-gamma processing unit 602 outputs the R, G and B signals that are converted to the linear data (Rt, Gt and Bt) to a virtual light source reflected component calculation unit 604 and a virtual light source addition processing unit 605.

Figure 7:
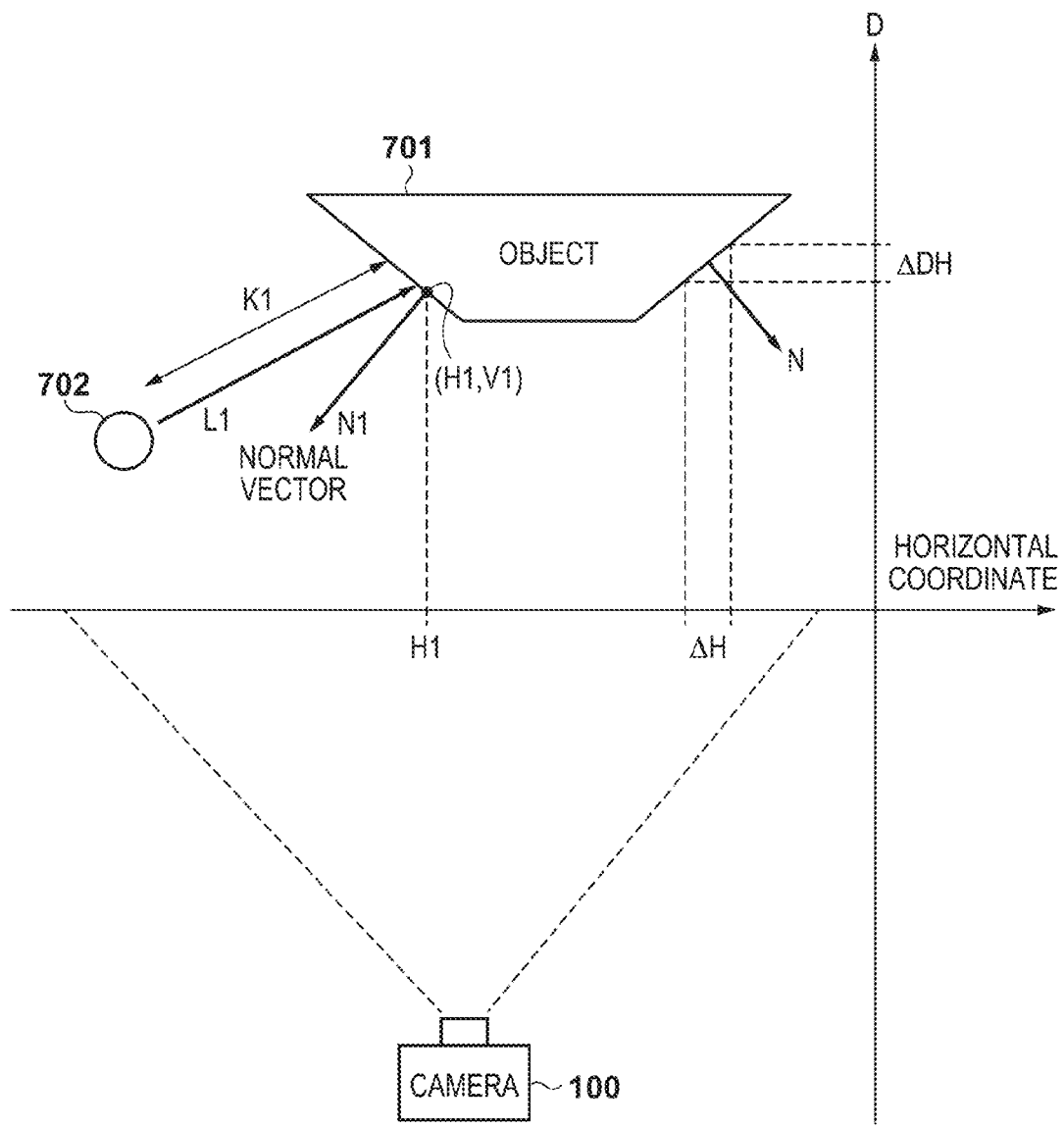
FIG. 7 is an explanatory view for explaining reflection of virtual light from the virtual light source according to the embodiment.

Meanwhile, a normal vector calculation unit 603 calculates a normal vector map as shape information that represents the shape of the object from the distance information of the object obtained from the distance measuring sensor 124. A known method is used as a method for generating the normal vector map from the distance information of the object. An example of the method will be explained with reference to FIG. 7. FIG. 7 is a diagram showing the relationship between the image shooting coordinates with respect to the camera 100 and an object 701. For example, with respect to the object 701 as shown in FIG. 7, from a difference ΔDH of the distance D with respect to a difference ΔH of a captured image in the horizontal direction and, although not shown, a difference ΔDV of the distance D with respect to a difference ΔV of the captured image in the vertical direction, inclination information of a part of the object 701 is calculated. Then, a normal vector is calculated from the calculated inclination information of the part of the object. Note that, in FIG. 7, the vertical direction of the captured image corresponds to the direction perpendicular to the paper surface of FIG. 7. With this calculation method, it is possible to calculate the normal vector N corresponding to each pixel of the captured image. The normal vector calculation unit 603 outputs the normal vectors N at a plurality of portions of the object 701 corresponding to respective pixels of the captured image to the virtual light source reflected component calculation unit 604 as the normal vector map.

The virtual light source reflected component calculation unit 604 calculates a component of the virtual light, that is virtually emitted by the set virtual light source, reflected by the object based on the distance K between the light source and the object, the normal vectors N, and the virtual light source parameters (calculated in the process shown in FIG. 3). More specifically, the virtual light source reflected component calculation unit 604 calculates the reflected component of virtual light for each portion of the object corresponding to the coordinate position of the captured image so as to be inversely proportional to the square of the distance K between the vertical light source and the portion of the object corresponding to each pixel, and proportional to the inner product of the normal N and the direction L of the virtual light source.

Below, the calculation method for the reflected component will be explained with reference to FIG. 7. In FIG. 7, the position 702 shows the position of the virtual light source set with respect to the object 701. The reflected component of the virtual light at the portion of the object 701 corresponding to the pixel position (H1, V1) in the captured image shot by the camera 100 is proportional to the inner product of the normal vector N1 at that portion and the direction vector L1 of the virtual light source, and is inversely proportional to the distance K1 between the virtual light source and the position of the object. The following equations (1) that express the above relationship show object reflection components (Ra, Ga, Ba) of light illuminated by the virtual light source.

$$Ra = \alpha \times (-L \cdot N)/K^2 \times Rw \times Rt$$

$$Ga = \alpha \times (-L \cdot N)/K^2 \times Gt \qquad (1)$$

$$Ba = \alpha \times (-L \cdot N)/K^2 \times Bw \times Bt$$

Here, α is an intensity of light of the virtual light source, L is a vector of the virtual light source in three dimensions, N is a normal vector of the object in three dimensions, and K is the distance between the virtual light source and the object. Further, Rt, Gt and Bt respectively represent R, G and B data output from the de-gamma processing unit 602, and Rw and Bw are parameters for controlling the color of the light source. In the embodiment, parameters which match the color of the virtual light source to the color of the ambient light source are set as explained with reference to FIG. 3. Rw and RW are calculated from a ratio of R, G and B values obtained without flash to R, G and B values obtained with flash as shown by the following equations (2).

$$Rw = (R \text{ without flash}/G \text{ without flash})/(Rt/Gt)$$

$$Bw = (B \text{ without flash}/G \text{ without flash})/(Bt/Gt) \qquad (2)$$

The reflected component (Ra, Ga, Ba) of the virtual light from the virtual light source calculated as above is outputted to the virtual light source addition processing unit 605. The virtual light source addition processing unit 605 performs processing shown by the following equations (3) on an object region illuminated by flash light.

$$Rout = Rt/S + Ra$$

$$Gout = Gt/S + Ga \qquad (3)$$

$$Bout = Bt/S + Ba$$

Here, 1/S is a gain for reducing the brightness at a portion illuminated by flash light. More specifically, a gain for reducing the brightness at a predetermined ratio is applied to the area affected by the flash light, then the relighting processing by the virtual light source is performed; thereby, shade is added to the image.

Figure 8A:
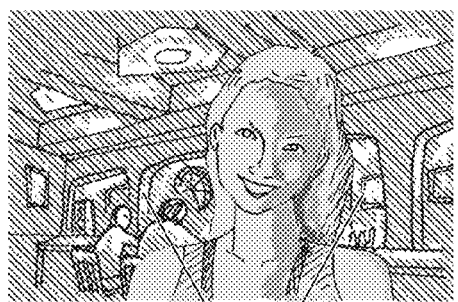
FIGS. 8A to 8D are diagrams showing examples of images to which shade caused by virtual light from a virtual light source is added according to the first embodiment.
Figure 8B:
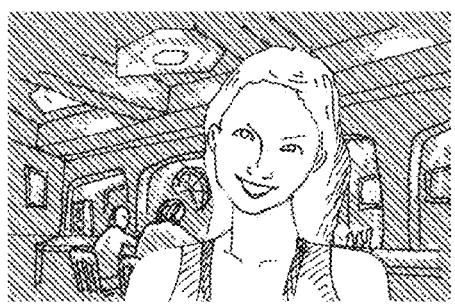
Figure 8C:
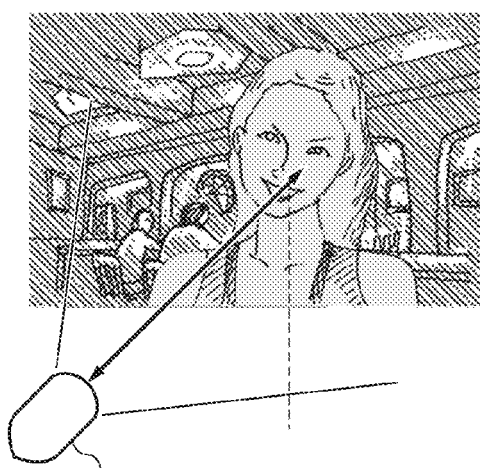
Figure 8D:
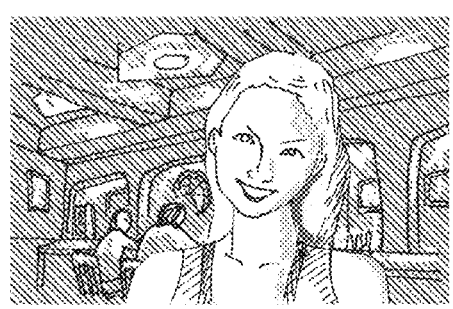

Images at respective stages of the relighting processing as described above are shown in FIGS. 8A to 8D. FIG. 8A shows an image captured without flashing the electronic flash unit 123 (R without flash, G without flash, B without flash). FIG. 8B shows an image captured with flashing of the electronic flash unit 123 (Rt, Gt, Bt). A region at which brightness changes significantly is specified by comparing the images obtained with/without flashing the electronic flash unit 123, and a process of reducing the brightness at the specified region is performed. FIG. 8C shows an image in which brightness of the portion affected by the flash light is reduced (Rt/S, Gt/S, Bt/S). FIG. 8D shows an image that has undergone the relighting processing using the virtual light source (Rout, Gout, Bout).

Returning to FIG. 6, the image signals (Rout, Gout, Bout) that have undergone the relighting processing by the virtual light source addition processing unit 605 are inputted to a gamma processing unit 606. The gamma processing unit 606 performs gamma processing on the input RGB signals. A luminance/chrominance difference signal conversion unit 607 generates a luminance signal Y and color difference signals R-Y and B-Y from the R, G and B signals (R'out, G'out, B'out).

The system controller 50 stores the luminance signal Y and the color difference signals R-Y and B-Y outputted by the relighting processing unit 114 to the image memory 106 under control of the memory controller 107, thereafter, the codec unit 110 compresses and encodes those signals. Then, the result is recorded on the recording medium 112 via the I/F 111.

According to the first embodiment as described above, a virtual light source is set at a position from which virtual light is emitted in the direction different from the direction of the flash light, and relighting processing is performed in accordance with a shape of an object on the basis of the reflected component of virtual light from a virtual light source. In this manner, it is possible to generate an image of the object with shade and plasticity.

Second Embodiment

Next, the second embodiment of the present invention will be explained with reference to FIGS. 9 and 10A to 10C. In the first embodiment as described above, the virtual light source is set, and a reflection component of virtual light emitted from the virtual light source is calculated and added to an original image. By contrast, in the second embodiment, a shade component caused by virtual light emitted from the virtual light source is calculated and added to the original image.

It should be noted that the overall configuration of the digital camera and the process for calculating the position of the virtual light source in the second embodiment are the same as those described in the first embodiment with reference to FIGS. 3 to 5C, therefore, the description thereof is omitted. However, the internal configuration of the relighting processing unit 114 in the second embodiment differs from that explained with reference to FIG. 6 in the first embodiment.

Figure 9:
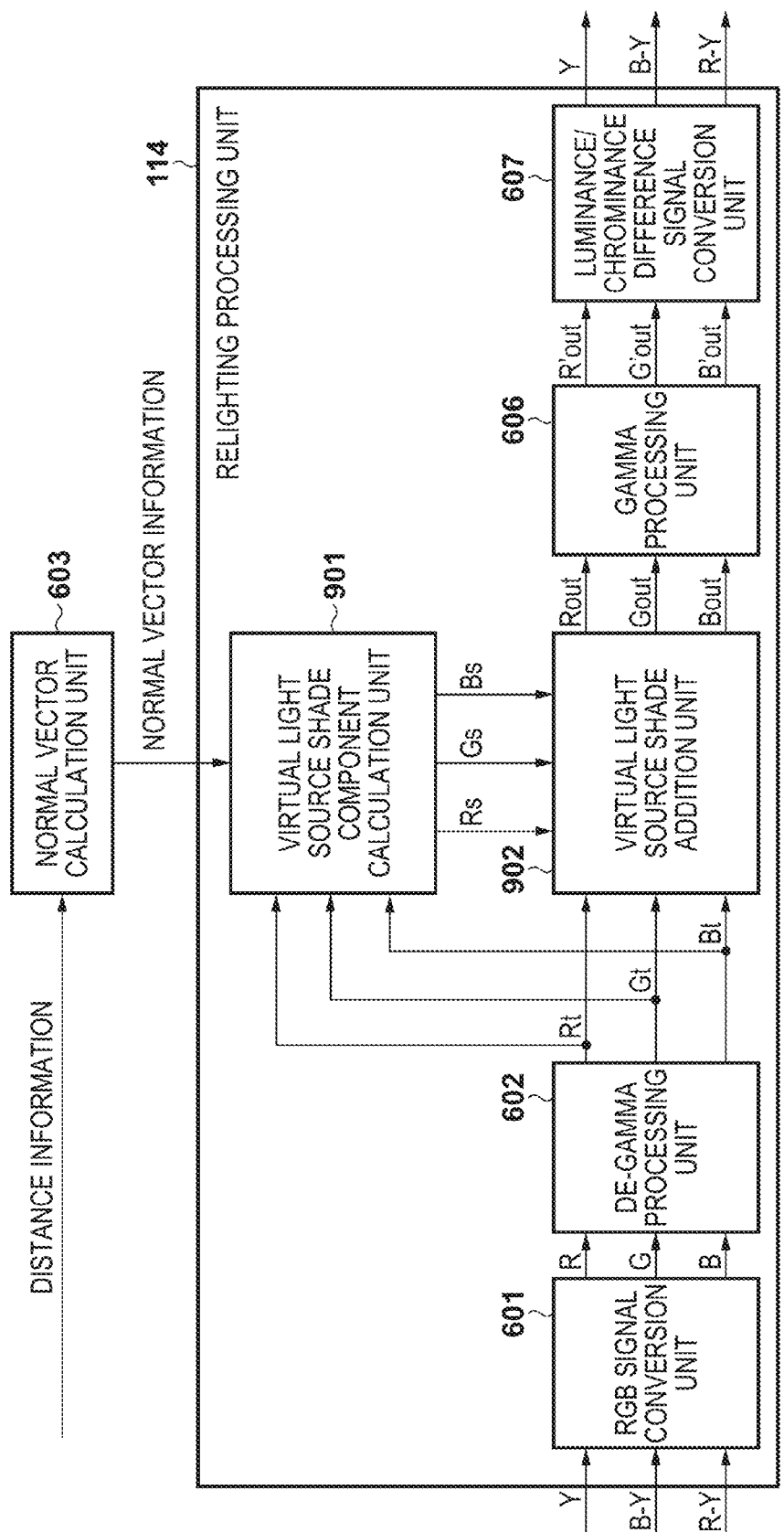
FIG. 9 is a block diagram illustrating a configuration of a relighting processing unit according to a second embodiment of the present invention.

FIG. 9 is a block diagram illustrating the internal configuration of the relighting processing unit 114 according to the second embodiment. In FIG. 9, constituents similar to those shown in FIG. 6 are given the same reference numerals, and explanations thereof are omitted. The relighting processing unit 114 shown in FIG. 9 has a virtual light source shade component calculation unit 901 and a virtual light source shade addition unit 902 in place of the virtual light source reflected component calculation unit 604 and the virtual light source addition processing unit 605 shown in FIG. 6.

The virtual light source shade component calculation unit 901 calculates a shade component generated when virtual light from the set virtual light source illuminates an object on the basis of the distance R between the virtual light source and the object, the normal vector N, and virtual light source parameters (calculated in the process in FIG. 3). More specifically, the virtual light source shade component calculation unit 901 calculates a reflected component at each coordinate position in the captured image so that the smaller the inner product of the normal N of the object and the direction L of the light source is, the larger the shade is to be added.

The above calculation method will be explained with reference to FIG. 7. The value of a reflected component at a pixel position (H1, V1) in the captured image shot by the camera 100 is proportional to the inner product of the normal N1 at the pixel position (H1, V1) and the direction vector L1 of the virtual light source, and inversely proportional to the distance K1 between the virtual light source and the object. By expressing this relationship by equations, the shade components (Rs, Gs, Bs) are expressed by the following equations (4).

$Rs=\alpha \times (1-(-L\cdot N))/K^2 \times Rc \times Rt$ $Gs=\alpha \times (1-(-L\cdot N))/K^2 \times Gc \times Gt$ $Bs=\alpha \times (1-(-L\cdot N))/K^2 \times Bc \times Bt$ (4)

Here, α is the intensity of light from the virtual light source, L is a three dimensional direction vector of the virtual light source, N is a three dimensional normal vector of the object, and K is the distance from the virtual light source and the object. Further, Rt, Gt and Bt indicate RGB data output from the de-gamma processing unit 602, and Rc, Gc and Bc are complementary colors of the object. Since it is assumed that the object is a human in the second embodiment, average values of colors in the face region of the object are calculated as Rc, Gc and Bc from the image data (Rt, Gt, Bt) that have undergone the de-gamma processing.

As described above, the shade components (Rs, Gs, Bs) caused by the virtual light source and calculated by the virtual light source shade component calculation unit 901 as described above are outputted to the virtual light source shade addition unit 902. The virtual light source shade addition unit 902 performs the process represented by the equations (5) on an object located at a distance closer than a predetermined distance.

$Rout=Rt-Rs$ $Gout=Gt-Gs$ $Bout=Bt-Bs$ (5)

Figure 10A:
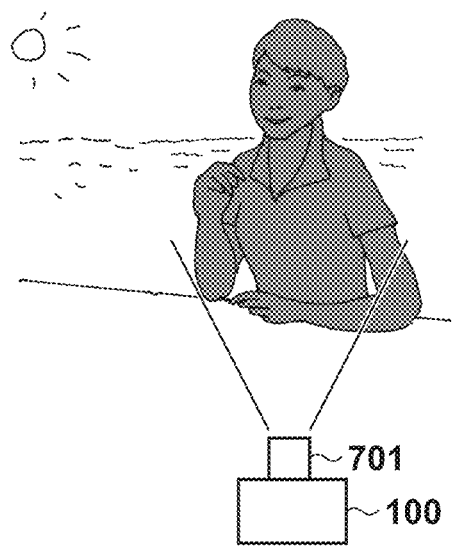
FIGS. 10A to 10C are diagrams showing examples of images to which shade caused by virtual light from a virtual light source is added according to the second embodiment.
Figure 10B:
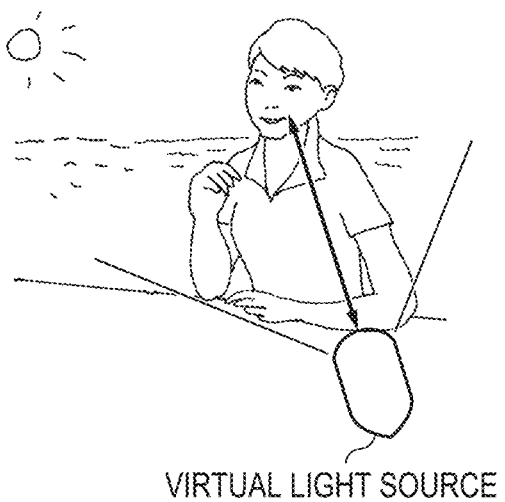
Figure 10C:
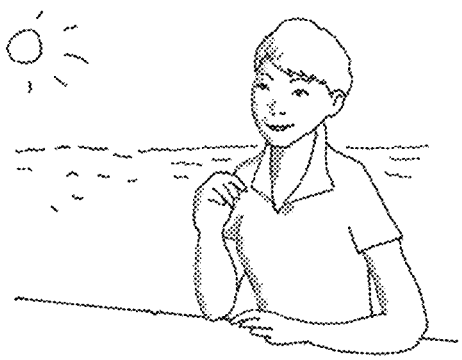

The result of this control is shown in FIGS. 10A to 10C. FIG. 10A shows an image shot without flashing the electronic flash unit 123. FIG. 10B shows an image (Rt, Gt, Bt) shot with flashing of the electronic flash unit 123. FIG. 10C shows an image (Rout, Gout, Bout) to which shade due to the virtual light source is added.

Referring to FIG. 9, the image signals (Rout, Gout, Bout) output from the virtual light source shade addition unit 902 are processed by the gamma processing unit 606 and the luminance/chrominance difference signal conversion unit 607, and a luminance signal Y and color difference signals R-Y and B-Y are outputted as the result of the processes as in the first embodiment.

According to the second embodiment as described above, the virtual light source is set at a position from which virtual light is emitted from the direction that is different from flash light with respect to an image shot with flash light, and a process of adding a shade component due to the virtual light source is added to a captured image. In this manner, it is possible to generate an image with shade and plasticity.

In the second embodiment, the virtual light source is set, and the shade component caused by the virtual light source is calculated. However, the present invention is not limited to this, and templates of shade generated when light illuminates an object from directions different from the flash light may be prepared in advance, and the shade component is added by selecting one of those shade templates.

Further, in the above embodiments, the position of the virtual light source is determined on the basis of the direction of the ambient light, however, the position of the virtual light source is not limited to this, and other methods can be used as long as light illuminates from the direction different from that of the flash light. For example, it is possible to configure the apparatus such that virtual light illuminates from a position at 45 degrees both in the horizontal and vertical directions with respect to the object.

Further, the above embodiments describe examples in which the light distribution characteristics of the virtual light source are made wider than that of the flash light, however, the present invention is not limited to this, and any light distribution characteristics are possible as long as the light distribution characteristics differ between the virtual light and the flash light. For example, the light distribution characteristics of an ambient light source are detected, and light distribution characteristics conforming to the detected ambient light source may be used. More specifically, whether the shooting scene is indoors or outdoors is detected, and in a case of outdoors, a parallel light source is set as the virtual light source, and in a case of indoors, a spot light source or a point light source is set as the virtual light source. In this manner, it is possible to obtain an image with more natural shade.

Other Embodiment

The present invention may be applied to a system comprised of a plurality of devices (e.g., a host computer, an interface, a scanner, a video camera, and so on) or to an apparatus comprised of a single device (e.g., a digital still camera, digital video camera, and so on).

Further, the relighting processing as described above may be performed in an image processing apparatus having no image sensor by recording, on a recording medium, an image captured with flash light and an image captured without flash light shot before or after the image with flash light.

Furthermore, in the above embodiments, it is described that the distance information is obtained by a distance measuring sensor, however, the present invention is not limited to this. For example, each pixel of the image sensing unit 103 may be configured to have a plurality of photoelectric conversion portions so that the respective photoelectric conversion portions receive light that has passed through different pupil areas of the lens group 101, respectively, and distance information may be obtained on the basis of the parallax of the pair of images represented by image signals output from each photoelectric conversion elements. In that case, by storing image signals obtained from each photoelectric conversion portions as distance information, it is possible to perform the relighting processing in the image processing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-216631, filed on Oct. 23, 2014 which is hereby incorporated by reference herein in its entirety.

What is claimed is:

1. An image processing apparatus which performs image processing on an image of an object shot with flashing of an illumination device, comprising at least one processor or one circuitry which functions as:
    a determination unit that determines a position of a virtual light source that emits virtual light, wherein the position is different from a position of the illumination device;
    a calculation unit that calculates a reflection component of the virtual light reflected by the object based on the shape of the object and the position of the virtual light source determined by the determination unit; and
    a processing unit that corrects brightness of an object area in the image so as to reduce a light component that is from the illumination device and reflected by the object and to add the reflection component of the virtual light reflected by the object.

2. The image processing apparatus according to claim 1, wherein the determination unit determines whether the image is shot against light or not, and, if the image is shot against light, sets the virtual light source at a predetermined position.

3. The image processing apparatus according to claim 1, wherein the determination unit determines the position of the virtual light source based on orientation of the object or a position of the object in the image.

4. The image processing apparatus according to claim 2, wherein the image processing apparatus further performs image processing on a second image of an object shot without flashing the illumination device, and
    the determination unit determines, if the image shot with flashing is not shot against light, the direction of ambient light illuminating the second image and sets a position of the virtual light source in the direction of the ambient light.

5. The image processing apparatus according to claim 1, wherein the calculation unit calculates normal vectors at a plurality of portions of the object that correspond to a plurality of predetermined positions of the object in the image based on distance information of distance to the object, and obtains each of the reflection components of the virtual light reflected by the object by making intensity of the virtual light proportional to an inner product of each of the normal vectors and a direction of the virtual light, and inversely proportional to the distance to each of the plurality of portions of the object.

6. The image processing apparatus according to claim 1, wherein the processing unit reduces brightness of the object in the image at a predetermined rate, and then adds the reflection component.

7. An image processing method of performing image processing on an image of an object shot with flashing of an illumination device, comprising:
    determining a position of a virtual light source that emits virtual light, wherein the position is different from a position of the illumination device;

calculating a reflection component of the virtual light reflected by the object based on the shape of the object and the position of the virtual light source determined by the determination unit; and correcting brightness of an object area in the image so as to reduce a light component that is from the illumination device and reflected by the object and to add the reflection component of the virtual light reflected by the object.

8. A non-transitory readable storage medium having stored thereon a program which is executable by an image processing apparatus which performs image processing on an image of an object shot with flashing of an illumination device, the program having a program code for realizing the image processing method that comprises:

determining a position of a virtual light source that emits virtual light, wherein the position is different from a position of the illumination device;

calculating a reflection component of the virtual light reflected by the object based on the shape of the object and the position of the virtual light source determined by the determination unit; and correcting brightness of an object area in the image so as to reduce a light component that is from the illumination device and reflected by the object and to add the reflection component of the virtual light reflected by the object.

* * * * *